United States Patent [19]
Arai
[11] 4,395,146
[45] Jul. 26, 1983

[54] METHOD AND APPARATUS FOR OPERATING A THERMAL PRINTER WITH UNIFORM HEAT DISTRIBUTION

[75] Inventor: Kiyoshi Arai, Higashikurume, Japan
[73] Assignee: Sony Corporation, Tokyo, Japan

[21] Appl. No.: 317,064
[22] Filed: Nov. 2, 1981
[30] Foreign Application Priority Data
Nov. 6, 1980 [JP] Japan ................................ 55-156242
[51] Int. Cl.³ ........................ B41J 3/04; G01D 15/10; G08B 5/36
[52] U.S. Cl. ................................ 400/121; 346/76 PH; 219/216
[58] Field of Search ................................ 400/120, 121; 346/76 PH; 219/216, 216 PH

[56] References Cited

U.S. PATENT DOCUMENTS 3,476,877 11/1969 Perkins et al. ................ 346/76 PH
3,913,091 10/1975 Aizawa et al. .................. 219/216 X
4,071,849 1/1978 Koyano et al. ................ 346/76 PH
4,141,018 2/1979 Mizuguchi et al. ............ 346/76 PH
4,149,171 4/1979 Sato et al. ...................... 346/76 PH
4,216,481 8/1980 Hakoyama ..................... 346/76 PH
4,219,824 8/1980 Asai .................................. 346/76 PH
4,246,587 1/1981 Reilly et al. .................... 346/76 PH
4,309,712 1/1982 Iwakura ......................... 346/76 PH
4,322,733 3/1982 Moriguchi et al. ............ 346/76 PH

FOREIGN PATENT DOCUMENTS 53-112755 10/1978 Japan ............................. 346/76 PH
53-145642 12/1978 Japan ............................. 346/76 PH
55-23466 2/1980 Japan ............................. 346/76 PH
2023317 12/1979 United Kingdom ................ 400/120

*Primary Examiner*—E. H. Eickholt
*Attorney, Agent, or Firm*—Lewis H. Eslinger; Alvin Sinderbrand

[57] ABSTRACT

A method and apparatus are provided for controlling a printer of the type having a number of blocks of print heads, each block including print heads preferably of the thermal print type. Data signals representing the selective energization of the print heads are stored, and these data signals are selectively read out to energize a group of print heads in each block, sequentially by block. After one group of print heads in each block is energized, another, different group of print heads in each block is energized, and so on, until all of the print heads have been energized. The print heads in each group are sufficiently spaced from each other to minimize thermal interference due to the energization of an adjacent print head. Consequently, the temperature of the print heads is distributed uniformly.

10 Claims, 4 Drawing Figures

METHOD AND APPARATUS FOR OPERATING A THERMAL PRINTER WITH UNIFORM HEAT DISTRIBUTION

BACKGROUND OF THE INVENTION

This invention relates to a method and apparatus for controlling a printer and, more particularly, to such a method and apparatus for establishing uniform heat distribution for all of the thermal print heads in such a printer, with minimal thermal interference due to the selective energization of adjacent print heads.

In one type of so-called line printer, a "line" of thermal print heads is divided into successive blocks. Each block is conditioned, sequentially, and the respective print heads included in each conditioned block are selectively energized in response to print-control data signals. Such data signals may be represented as, for example, "print" or "no-print" signals, such as in the form of binary "1"s and "0"s, respectively. Head drivers are coupled to the print heads in each block, these head drivers being responsive to the binary "1"s and "0"s to selectively energize the corresponding print heads in each conditioned block. Thus, the print heads in one block are selectively energized, followed by the print heads in the next adjacent block, followed by the print heads in the next adjacent block, and so on.

If all of the print heads in a block are energized, the heat distribution across such heads may be graphically represented trapezoidal in shape. That is, the temperature of the print heads at opposite ends of the block such as the left-most and right-most print heads, generally will be less than the temperature of the remaining print heads, the latter being substantially the same. This difference in temperature is due to the fact that the heat generated by the opposite end print heads is better dispersed than the heat which is generated in the remaining print heads. That is, a head which is interposed between two other heads will be heated, at least in part, by such two heads. However, a head which is disposed at the end of a block is adjacent only one additional head and, therefore, is heated to a lesser extent by this single head.

Now, if the next-adjacent block is conditioned to be energized, the end print head in this block, which is adjacent one of the end print heads in the preceding block, will be "pre-heated" by that adjacent end head. Hence, the temperature of the end head of this next-following block will be greater because it is contributorily heated by the adjacent end head of the preceding block. It is possible, therefore, that the temperature of this end head of the next-following block will be greater than the temperature of any of the remaining heads therein. This non-uniformity in the heat distribution of the next-following block of print heads may result in a printed indicium that is too dark, thus degrading the quality of the image printed by the printer.

OBJECTS OF THE INVENTION

Therefore, it is an object of the present invention to provide a method and apparatus for controlling a printer of the aforenoted type, wherein the deficiencies caused by non-uniform heat distribution across adjacent blocks of print heads are avoided.

Another object of this invention is to provide a method and apparatus for controlling a printer of the aforenoted type so as to minimize the affects of "pre-heating" a thermal print head by adjacent print heads.

A further object of this invention is to provide a method and apparatus for controlling a printer of the aforenoted type so as to print images having high quality and proper contrast.

An additional object of this invention is to provide a method and apparatus for controlling a printer of the aforenoted type, wherein selected ones of the print heads, which are physically spaced from each other, are energized so as to minimize the thermal contribution of one due to the energization of another.

Various other objects, advantages and features of the present invention will be readily apparent from the ensuing detailed description, and the novel features will be particularly pointed out in the appended claims.

SUMMARY OF THE INVENTION

In accordance with this invention, a method and apparatus are provided for controlling a printer of the type having a number of blocks of print heads, each block including a plurality of heads. Data signals representing the selective energization of the print heads are received and stored, such data signals being used to energize a group of print heads in each block, sequentially by block. The group of print heads to be energized changes after the selected group in all blocks has been energized.

In accordance with a particular embodiment, every fourth print head, starting with the first print head, in each block is energized, and then every fourth print head starting with the second head in each block is energized, and so on, until all of the print heads have been selectively energized, depending upon the data signals which are supplied to the printer.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figures 1, 2A, 2B:
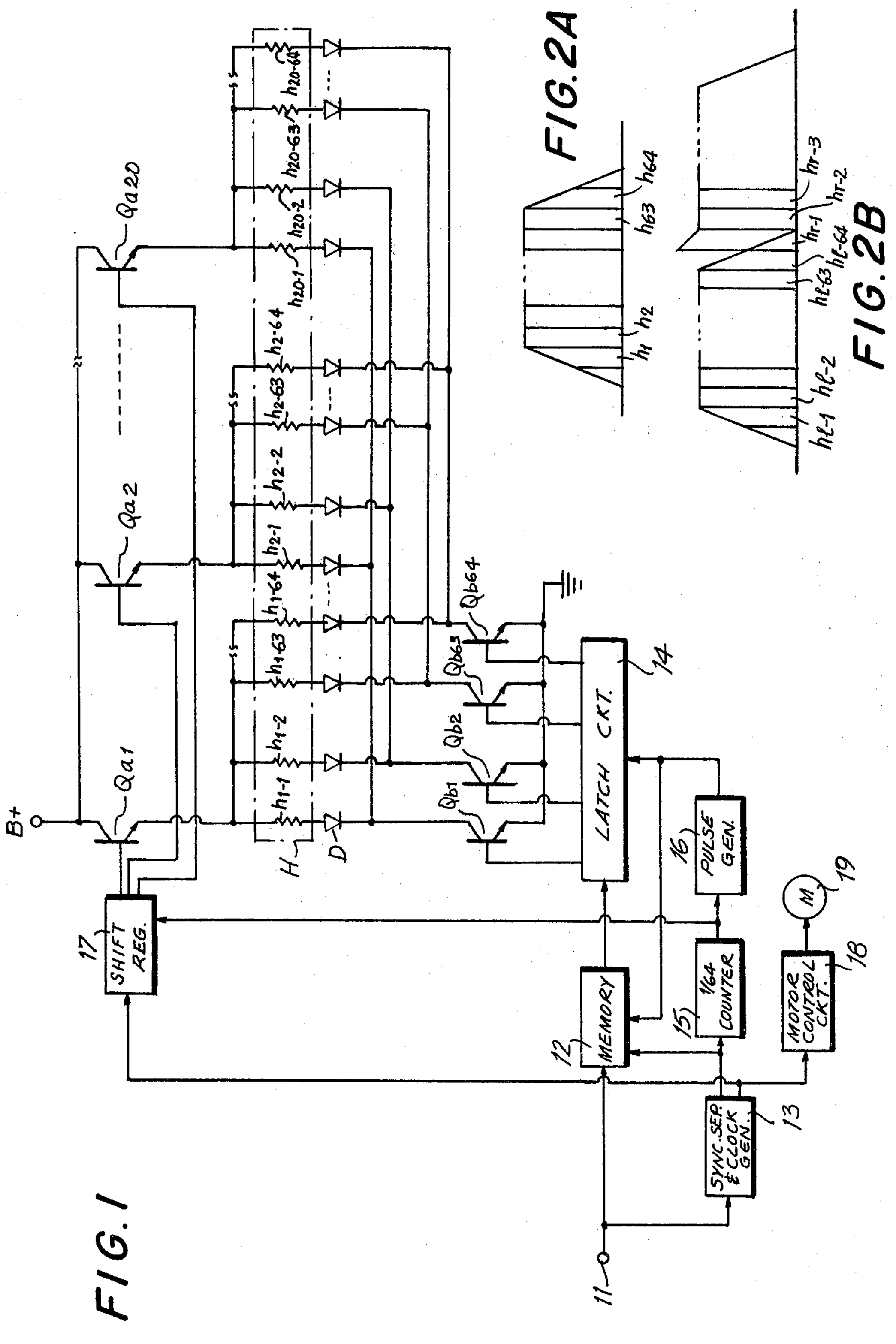
FIG. 1 is a partial block, partial schematic diagram of a thermal printer with which the present invention finds ready application.
FIGS. 2A and 2B are graphical representations of the heat distribution at the heads of the thermal printer.

Referring now to the drawings, wherein like reference numerals are used throughout, FIG. 1 is a partial block, partial schematic diagram of a thermal printer of the type wherein the present invention finds ready application. The apparatus shown in FIG. 1 does not include the subject matter of this invention.

The printer of FIG. 1 is comprised of print heads H which, for example, are thermal print heads which record, or print, indicia by heating a suitable record medium. The apparatus used to control heads H, as illustrated in FIG. 1, is comprised of a memory 12, a latch circuit 14, a shift register 17, and a timing control circuit comprised of synchronizing signal separator and clock generator 13, counter 15 and pulse generator 16. Memory 12 is adapted to receive and to store data signals that represent which ones of heads H are to be energized. The heads preferably are arranged in m blocks, each block including n heads. As a numerical example, twenty blocks of heads are provided, each being formed of 64 separate print heads. The heads of block 1 are illustrated as $h_{1-1}$, $h_{1-2}$, . . . $h_{1-63}$ and $h_{1-64}$. The heads included in the second block are illustrated as heads $h_{2-1}$, $h_{2-2}$, . . . $h_{2-63}$ and $h_{2-64}$. The heads included in the twentieth block are illustrated as heads $h_{20-1}$, $h_{20-2}$, . . . $h_{20-63}$ and $h_{20-64}$. Thus, a total of 1,280 print heads are provided. In one embodiment, these print heads are aligned so as to print a line of indicia on a record medium.

In the embodiment wherein heads H are adapted to print a line of indicia, memory 12 is adapted to store a "line" of data signals, these data signals representing the selective energization or de-energization of respective ones of heads H. It will be appreciated that a binary "1" represents that a head should be energized, and a binary "0" represents that a head should be de-energized. Accordingly, memory 12 may include 1,280 storage locations, each being associated with a respective one of the 1,280 print heads, and each storage location being adapted to store a binary "1" energizing signal or a binary "0" de-energizing signal.

Memory 12 is coupled to latch circuit 14 and is adapted, in response to read-out pulses supplied to the memory, to shift corresponding ones of the data signals into the latch circuit. The data signals stored in memory 12 may be thought of as being divided into blocks of data signals, each block being associated with a respective block of print heads H, and each block of data signals being formed of 64 energizing/de-energizing signals. Latch circuit 14 has a storage capacity sufficient to store one block of data signals and, therefore, in accordance with the example being described, the latch circuit includes 64 storage compartments. Thus, the latch circuit is adapted to store one block of data signals read out from memory 12.

Each storage compartment of latch circuit 14 is coupled to the base electrode of a respective head-drive transistor $Q_{b1}$, $Q_{b2}$, . . . $Q_{b63}$ and $Q_{b64}$. As illustrated, the collector-emitter circuit of each head-drive transistor is connected in series with a respective head in each block. Thus, heads $h_{1-1}$, $h_{2-1}$, . . . $h_{20-1}$ all are coupled in common to the collector-emitter circuit of transistor $Q_{b1}$. Likewise, heads $h_{1-2}$, $h_{2-2}$, . . . $h_{20-2}$ are coupled in common to the collector-emitter circuit of transistor $Q_{b2}$. The remaining heads in each block are similarly coupled in common to the collector-emitter circuit of a respective transistor. Diodes D also are connected in series with each head so as to prevent a reverse current flow through a head which is cut off in response to current which is flowing through a common-coupled head in another block. It will be recognized that the presence of a binary "1" energizing signal in a respective storage location in latch circuit 14 renders the corresponding transistor conductive so as to permit current to flow through a selected one of the heads coupled to that transistor. The particular head through which current flows when transistor $Q_b$ is rendered conductive is determined by the particular block of print heads which is conditioned to be energized.

Shift register 17 is coupled to counter 15 and is provided with, for example, twenty stages, each of which is adapted to be mutually exclusively actuated. Each stage includes an output terminal coupled to a respective one of block-selecting transistors $Q_{a1}$, $Q_{a2}$, . . . $Q_{a20}$. Thus, depending upon which stage of shift register 17 is actuated, a corresponding one of the block-selecting transistors is rendered conductive so as to condition the block of print heads coupled thereto to be energized. As illustrated in FIG. 1, the first block of print heads $h_{1-1}$–$h_{1-64}$ is connected in common to the emitter of block-selecting transistor $Q_{a1}$. Likewise, all of the print heads included in the second block $h_{2-1}$–$h_{2-64}$ are coupled in common to the emitter of block-selecting transistor $Q_{a2}$. The remaining blocks of print heads are similarly connected to respective block-selecting transistors. Thus, it is appreciated that a particular print head is energized if the block-selecting transistor connected thereto is rendered conductive and the particular head-drive transistor connected in series therewith also is rendered conductive.

Synchronizing signal separator and clock generator 13 is coupled to an input terminal 11 to receive a line synchronizing signal that normally accompanies each line of data signals supplied to memory 12. The synchronizing signal separator and clock generator is adapted to separate this line synchronizing signal and supply it to shift register 17 as a reset signal. Thus, the shift register is reset to actuate a predetermined stage at the beginning of each line of data signals. The separated line synchronizing signal also is supplied to a motor control circuit 18 so as to synchronize the operation of this circuit. The motor control circuit is adapted to drive motor 19, this motor being used to advance the record medium by a sufficient amount so as to permit the next-following line of indicia to be printed thereon. It is recognized that, by this advancement of the record medium in combination with the selective energization of print heads H, alphanumeric characters, graphical representations or other viewable images may be printed upon the record medium.

Counter 15 is a so-called count-to-64 counter and is coupled to synchronizing signal separator and clock generator 13 to receive a synchronized clock signal therefrom. This clock signal also is supplied to memory 12 to read out a respective block of data signals therefrom. Counter 15 produces an output pulse upon reaching a count of 64 which, it is recognized, coincides with the last data signal in a block to be read out of memory 12. The output pulse produced by counter 15 is supplied to shift register 17 so as to advance the shift register to actuate the next-following stage, thereby selecting the next-following block of print heads to be conditioned for energization. The output pulse produced by counter 15 also is supplied to a pulse generator 16, whereupon the next block of data signals stored in memory 12 is selected to be read out. The output of pulse generator 16 also is supplied to latch circuit 14 to enable the contents of this latch circuit to be replaced by the next block of 64 data signals now read out of memory 12.

The operation of the printer apparatus illustrated in FIG. 1 now will be briefly described. A line of data signals supplied to input terminal 11 is stored in memory 12. Preferably, the memory includes a storage location for each of print heads $h_{1-1}$ . . . $h_{20-64}$. A line synchronizing signal precedes the line of data signals, this line synchronizing signal being detected by synchronizing signal separator and clock generator 13. The detected synchronizing signal is supplied to shift register 17 to reset the shift register so as to actuate the first stage therein, whereby block-selecting transistor $Q_{a1}$ is rendered conductive to condition the first block of print heads to be energized. The detected line synchronizing signal also is supplied to motor control circuit 18 so as to drive motor 19, thereby advancing the record medium a sufficient amount in preparation for the printing of another line of indicia.

After a line of data signals is stored in memory 12, read clock signals generated by synchronizing signal separator and clock generator 13 read out the first block of data signals in seriatum. This block of data signals is stored in corresponding storage compartments of latch circuit 14. Those storage compartments having a binary "1" energizing signal stored therein render the respective head-drive transistors $Q_{b1} \ldots Q_{b64}$ coupled thereto conductive. Thus, depending upon which of these head-drive transistors is conducting, the corresponding print head $h_{1-1} \ldots h_{1-64}$ coupled thereto is energized to print an indicium on the record medium.

After a block of 64 data signals is read out of memory 12, counter 15, which is incremented by the read clock pulses, attains a count of 64 to actuate shift register 17, thereby actuating the next stage thereof. Hence, block-selecting transistor $Q_{a1}$ is rendered non-conductive, and block-selecting transistor $Q_{a2}$ now conducts, thereby conditioning the second block of print heads to be energized. The output pulse produced by counter 15 also triggers pulse generator 16 to select the next block of 64 data signals to be read out of memory 12, and to enable latch circuit 14 to store this next block of data signals.

Accordingly, in the manner described hereinabove, successive blocks of print heads $h_{1-1} \ldots h_{1-64}$, followed by print heads $h_{2-1} \ldots h_{2-64}$, and so on, are selectively energized in accordance with the data signals that have been stored in memory 12. An entire line of indicia is printed after the block of print heads $h_{20-1} \ldots h_{20-64}$ is energized. Then, the next-following line of data signals is supplied to memory 12, and the foregoing operation is repeated. Consequently, a viewable image is printed, line-by-line, on the record medium.

In the embodiment shown in FIG. 1, if all of the print heads included in a block of heads is energized, the heat distribution at the heads is illustrated graphically in FIG. 2A. It is seen that most of the heads exhibit a higher temperature than those heads $h_1$ and $h_{64}$ which are positioned at opposite ends of the block. This is because heads $h_2 \ldots h_{63}$ are interposed between two heads and receive some heat from those two heads, thus contributing to its temperature. However, the heads $h_1$ and $h_{64}$ disposed at the opposite ends of the block are adjacent only a single head. Consequently, there is much less contribution to the temperature of these end heads due to the single head ($h_2$ and $h_{63}$, respectively) which is adjacent thereto. That is, there is greater heat dispersion at end heads $h_1$ and $h_{64}$ than at any of the intermediate, interior heads $h_2 \ldots h_{63}$.

When successive, adjacent blocks of print heads are energized, the heat distribution at such heads is illustrated graphically in FIG. 2B. For convenience, the graphical representation shown at the left-hand portion of FIG. 2B represents the heat distribution of a block of print heads which may be considered to be at the left, which print heads are identified as $h_{l-1} \ldots h_{l-64}$; and the graphical representation shown at the right-hand side of FIG. 2B represents the heat distribution of the next-adjacent block of print heads which may be considered to be to the right of the preceding block, the print heads included therein being identified as heads $h_{r-1}$, $h_{r-2}$, $h_{r-3}$ . . . . It is seen that, after the left block of print heads is energized, the right block of print heads is energized directly. Hence, although end head $h_{l-64}$ receives no thermal contribution from its next-adjacent head $h_{r-1}$, this end head $h_{r-1}$ in the next-following block receives heat from the end head $h_{l-64}$ in the preceding block. Consequently, the end head $h_{r-1}$ in the next-following block may be thought of as being "pre-heated" by the end head $h_{l-64}$ of the preceding block. As graphically illustrated in FIG. 2B, the temperature of end head $h_{r-1}$ is higher than the temperature of the remaining heads in this block because of the pre-heating due to the end head $h_{l-64}$ in the preceding block.

In view of the thermal distribution shown in FIG. 2B, the indicium printed by head $h_{r-1}$ will be darker than expected. Hence, a perceptible contrast will be printed at the change-over, or boundary, from one block of print heads to the other. This tends to degrade the image printed by the line printer.

In the graphical representation shown in FIG. 2B, print heads $h_{l-1} \ldots h_{l-64}$ may correspond to the block of print heads $h_{1-1} \ldots h_{1-64}$; and print head $h_{r-1}$ may correspond to print head $h_{2-1}$, shown in FIG. 1.

The present invention eliminates the undesired thermal distribution shown in FIG. 2B. This is achieved by energizing only a selected group of print heads in each block block-by-block, and then, after the last block of print heads is energized, repeating the process for a different group of print heads in each block, and so on, until all of the print heads have been properly energized. One embodiment for carrying out this invention is illustrated in FIG. 3.

Figure 3:
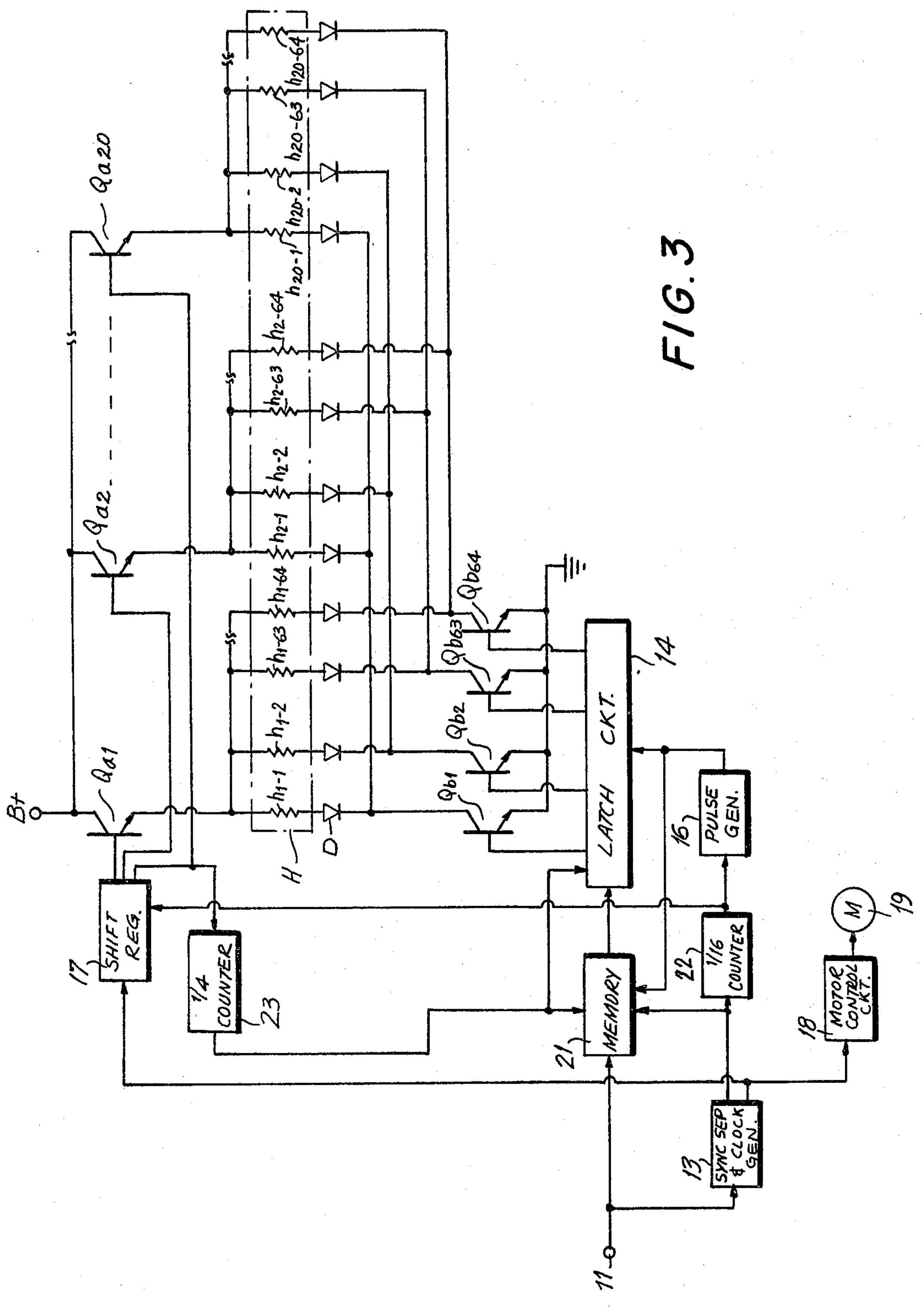
FIG. 3 is a partial block, partial schematic diagram of a printer incorporating the present invention.

Many of the elements shown in FIG. 3 are the same as those described previously with respect to FIG. 1, and are identified by the same reference numerals. In the interest of brevity, only the differences between the illustrated embodiments will be described. In FIG. 3, counter 15 is replaced with counter 22 which is adapted to count to 16. An additional counter 23, which is adapted to count to 4, also is provided. Counter 23 is supplied with the separated line synchronizing signal and, in addition, includes a count input coupled to, for example, the twentieth stage of shift register 17. The output of counter 23 is coupled to latch circuit 14 and also to the memory. In FIG. 3, memory 12 is replaced by a similar memory 21, memory 21 being adapted to read out a group of data signals in accordance with the particular count exhibited by counter 23. That is, the particular block of data signals which is read out from memory 21 is incremented by, for example, the pulse supplied thereto by pulse generator 16, and selected ones of the data signals included in that block, such selected data signals being referred to herein as a "group" of data signals, is selected by the count of counter 23. A corresponding group of storage compartments included in latch circuit 14 are enabled by the count of counter 23 so as to store this group of read out data signals.

The operation of the embodiment shown in FIG. 3 will best be understood by describing a particular numerical example. Let it be assumed that a line of data signals is stored in memory 21. As before, these data signals are stored in respective storage locations, each being associated with a respective one of print heads H. Thus, the data signals stored in memory 21 may be thought of as being comprised of blocks of data signals for energizing respective ones of the heads included in corresponding blocks of print heads H. As before, a line synchronizing signal precedes the line of data signals, this line synchronizing signal being separated by synchronizing signal separator and clock generator 13 and used to reset shift register 17 and also to reset the count of counter 23 to a count of [00]. In response to this count, memory 21 is controlled to select the data signals stored in storage locations 1, 5, 9, . . . 61 of each block of data signals stored therein.

Since shift register 17 is reset, the first stage thereof is actuated so as to render block-selecting transistor $Q_{a1}$ conductive, thereby conditioning the first block of print heads for energization. Now, the read clock pulses supplied to memory 21 read out those data signals in the first block, as selected by the count of counter 23. These data signals are stored in corresponding storage compartments of latch circuit 14, thereby energizing print heads $h_{1-1}$, $h_{1-5}$ . . . $h_{1-61}$. It will be appreciated that counter 23 selects every fourth data signal included in a block of data signals to be read out. Consequently, sixteen data signals are read out of memory 21. When the sixteenth data signal is read out, counter 22 produces an output pulse to shift the actuated stage of shift register 17 to the next-adjacent block. Consequently, transistor $Q_{a1}$ is rendered non-conductive, and block-select transistor $Q_{a2}$ now conducts to condition the second block of print heads for energization.

The output pulse produced by counter 22 triggers pulse generator 16 to select the next, or second, block of data signals to be read out of memory 21. Since the count of counter 23 remains at its [00] count, the same group of data signals in this second block of data signals is read out of memory 21. These data signals are stored in corresponding storage compartments of latch circuit 14 so as to energize print heads $h_{2-1}$, $h_{2-5}$, . . . $h_{2-61}$.

The foregoing operation is repeated, sequentially by block, with the same group of data signals in each block being read out. Hence, the first, fifth, . . . sixty-first print head in each block are energized. After the last, or twentieth, stage of shift register 17 is actuated, and after the last block of print heads is energized, counter 22 actuates shift register 17 to shift the actuated stage thereof from the last stage to the first stage. Counter 23, which is incremented in response to this change-over in shift register 17, thus has its count incremented to [01]. In accordance with this count, a different group of data signals in each block stored in memory 21 now is selected. In particular, this group of data signals is comprised of the second, sixth, . . . sixty-second data signals in each block. Accordingly, as before, when the contents of memory 21 are read out sequentially by block, print heads $h_{1-2}$, $h_{1-6}$ . . . $h_{1-62}$ are energized, followed by print heads $h_{2-2}$, $h_{2-6}$ . . . $h_{2-62}$, and so on. Finally, after this group of data signals included in the last, or twentieth, block stored in memory 21 is read out, resulting in the energization of print heads $h_{20-2}$, $h_{20-6}$ . . . $h_{20-62}$, shift register 17 is changed over to actuate the first stage thereof, and the count of counter 23 is incremented to a count of [10]. Now, the group of data signals formed of the third, seventh, . . . sixty-third data signals in each block stored in memory 21 is selected to be read out. In accordance with the aforedescribed operation, this group in each block of print heads is energized, block-by-block. Thus, print heads $h_{1-3}$, $h_{1-7}$ . . . $h_{1-63}$ in the first block are energized, followed by print heads $h_{2-3}$, $h_{2-7}$ . . . $h_{2-63}$ in the second block, and so on, until the last block of print heads $h_{20-3}$, $h_{20-7}$ . . . $h_{20-63}$ are energized. Then, as before, shift register 17 is changed over to actuate the first stage thereof and the count of counter 23 is incremented to the count of [11]. In accordance with this count, the group of data signals comprised of the fourth, eighth, . . . sixty-fourth data signals in each block stored in memory 21 is selected to be read out. Hence, this group of print heads is energized, block-by-block, resulting in the energization of print heads $h_{1-4}$, $h_{1-8}$ . . . $h_{1-64}$, followed by the energization of print heads $h_{2-4}$, $h_{2-8}$ . . . $h_{2-64}$, and so on. After this group in the last block of print heads is energized, the next-following line of data signals is written into memory 21, counter 23 is reset to its initial count [00], shift register 17 is reset such that the first stage thereof is actuated, and the foregoing operation is repeated.

A summary of the selected group of print heads which is energized in response to the count of counter 23 is set out in the following table.

TABLE

| ENERGIZED PRINT HEADS Counter 13 | | | |
|---|---|---|---|
| [00] | [01] | [10] | [11] |
| $h_{1-1}$ | $h_{1-2}$ | $h_{1-3}$ | $h_{1-4}$ |
| $h_{1-5}$ | $h_{1-6}$ | $h_{1-7}$ | $h_{1-8}$ |
| . . . | . . . | . . . | . . . |
| $h_{1-61}$ | $h_{1-62}$ | $h_{1-63}$ | $h_{1-64}$ |
| $h_{2-1}$ | $h_{2-2}$ | $h_{2-3}$ | $h_{2-4}$ |
| $h_{2-5}$ | $h_{2-6}$ | $h_{2-7}$ | $h_{2-8}$ |
| . . . | . . . | . . . | . . . |
| $h_{2-61}$ | $h_{2-62}$ | $h_{2-63}$ | $h_{2-64}$ |
| $h_{3-1}$ | $h_{3-2}$ | $h_{3-3}$ | $h_{3-4}$ |
| $h_{3-5}$ | $h_{3-6}$ | $h_{3-7}$ | $h_{3-8}$ |
| . . . | . . . | . . . | . . . |
| $h_{3-61}$ | $h_{3-62}$ | $h_{3-63}$ | $h_{3-64}$ |
| . . . | . . . | . . . | . . . |
| $h_{20-1}$ | $h_{20-2}$ | $h_{20-3}$ | $h_{20-4}$ |
| $h_{20-5}$ | $h_{20-6}$ | $h_{20-7}$ | $h_{20-8}$ |
| . . . | . . . | . . . | . . . |
| $h_{20-61}$ | $h_{20-62}$ | $h_{20-63}$ | $h_{20-64}$ |

In accordance with the present invention, it is seen that the undesired thermal distribution graphically depicted in FIG. 2B is avoided. That is, by the selection of different groups of print heads, the problem of energizing print head $h_{r-1}$ immediately after the energization of print head $h_{l-64}$ is avoided. The print heads included in each group that is energized are sufficiently spaced from each other so as to minimize the contribution of heat from one to the next-adjacent head.

While the present invention has been particularly shown and described with reference to a preferred embodiment, it will be readily appreciated by those of ordinary skill in the art that various changes and modifications in form and details may be made without departing from the spirit and scope of the invention. For example, although each group of print heads is selected to be one-fourth of the print heads included in a block, any other suitable fraction may be used. For example, if each group is formed of one-third of the total print heads in a block, then memory 21 will be "scanned" for a read-out operation, block-by-block, three times. That is, first the first group of data signals in each block is read out to energize the print heads, then the second group in each block is read out and then the third group in each block is read out. Likewise, if each group of print heads to be energized is one-sixth of the total number of print heads in a block, then memory 21 will be scanned block-by-block six times in order to read out all of the data signals therefrom. That is, the first group of data signals in each block will be read out, followed by the second group in each block, followed by the third group, and so on. It is, of course, recognized that the group which is selected in each block remains the same until that group in the last block of data signals has been read out; and then the selected group will be changed.

Stated in general terms, the print heads H may be thought of as being divided into m blocks, each block being formed of n print heads. Counter 23 thus is incremented following the conditioning of the m-th block of print heads for energization.

Preferably, the group of data signals which is read out from memory 21 and stored in latch circuit 14 is used to energize concurrently the corresponding group of print heads in the conditioned block.

It is appreciated that the duration of energization of each group of print heads in the conditioned block is reduced by one-fourth that of the embodiment shown in FIG. 1. This reduction in the energization duration may result in a corresponding reduction in the amount of heat which is generated by the print heads. Accordingly, it may be advantageous to increase the current flowing through the energized print heads during this reduced duration, as by increasing the power supply voltage B+.

It is intended that the appended claims be interpreted as including the foregoing as well as various other changes and modifications.

What is claimed is:

1. Apparatus for controlling a printer of the kind having m blocks of print heads, each block including n print heads (m and n are integers), comprising storage means for storing data representing the selective energization of said print heads; selecting means for selecting a group of nonadjacent data in each block, where the number of data in each said group is less than n; and energizing means responsive to said data for energizing print heads in each block corresponding to said selected group of data, each successive block being energized sequentially, said selecting means including means for selecting a different group of data following each energization of the corresponding print heads in the m-th block.

2. The apparatus of claim 1 wherein said selecting means further includes counter means incremented following the energization of print heads in said m-th block, said counter means being coupled to said storage means for controlling the group of data to which said energizing means is responsive in accordance with the count of said counter means.

3. The apparatus of claim 2 wherein said energizing means includes n switch means, each coupled to a respective one of said n print heads and each being actuable to energize said respective print head; and wherein said n switch means are actuable to energize a group of print heads corresponding to the group of data selected by said counter means.

4. The apparatus of claim 3 wherein said energizing means further includes block selecting means for successively selecting each of said m blocks of print heads to be energized, block-by-block.

5. The apparatus of claim 4 wherein said block selecting means comprises shift register means for producing successive block select signals, each block select signal selecting a respective one of said m blocks of print heads to be energized, said shift register means being coupled to said counter means for incrementing said counter means following the production of the m-th block select signal.

6. The apparatus of claim 5 wherein said storage means comprises memory means for storing data signals representing the selective energization of each print head in each of said m blocks of print heads, read-out means for reading out successive blocks of data signals representing the selective energization of a respective block of print heads; and said count of said counter means determining the group of data signals in each block that is read out of said memory means.

7. The apparatus of claim 6 wherein said energizing means further includes latch means having n storage compartments for storing n data signals, respectively; said read-out means reading out said data signals from said memory means to said latch means, and said count of said counter means determining a group of storage compartments of said latch means into which said read out data signals are stored; each storage compartment of said latch means being coupled to a respective one of said switch means.

8. A method of controlling a printer of the kind having m blocks of energizable thermal print heads, each block including n thermal print heads, such that the print heads, when energized, exhibit a substantially uniform heat distribution, said method comprising the steps of storing m blocks of data signals, each block of data signals representing the selective energization of a respective block of n print heads; conditioning, block-by-block, each block of print heads; selecting a group of data in each block to be printed; energizing the print heads in a conditioned block of print heads corresponding to the selected group of data; and recurrently selecting a different group of data in each block after the m-th block of print heads has been conditioned and energized, wherein each successive selected group of data is fed to the corresponding print heads in each block of energized thermal print heads.

9. The method of claim 8 wherein said step of recurrently selecting a different group of data in each block comprises cyclically counting the number of times the m-th block of print heads is conditioned; and determining said selected group of data to be printed based upon the count of said last-mentioned step.

10. The method of claim 8 wherein said step of energizing comprises reading out block-by-block a selected group of stored data signals, temporarily storing the read out group of data signals; and using the temporarily stored data signals to selectively energize a respective group of print heads.

* * * * *